(12) United States Patent
Matsuda et al.

(10) Patent No.: US 10,766,085 B2
(45) Date of Patent: Sep. 8, 2020

(54) WORK PROCESSING APPARATUS AND METHOD FOR MANUFACTURING A PROCESSED WORK

(71) Applicant: ORIGIN COMPANY, LIMITED, Saitama-shi, Saitama (JP)

(72) Inventors: Jun Matsuda, Saitama (JP); Tatsuo Okubo, Saitama (JP); Naoto Ozawa, Saitama (JP)

(73) Assignee: ORIGIN COMPANY, LIMITED, Saitama-shi, Saitama (JP)

( * ) Notice: Subject to any disclaimer, the term of this patent is extended or adjusted under 35 U.S.C. 154(b) by 0 days.

(21) Appl. No.: 16/496,919

(22) PCT Filed: Mar. 23, 2018

(86) PCT No.: PCT/JP2018/011727
§ 371 (c)(1),
(2) Date: Sep. 23, 2019

(87) PCT Pub. No.: WO2018/181000
PCT Pub. Date: Oct. 4, 2018

(65) Prior Publication Data
US 2020/0122256 A1 Apr. 23, 2020

(30) Foreign Application Priority Data
Mar. 30, 2017 (JP) ................. 2017-068056

(51) Int. Cl.
*B23K 1/00* (2006.01)
*B23K 1/008* (2006.01)
(Continued)

(52) U.S. Cl.
CPC ............... *B23K 1/008* (2013.01); *B23K 3/08* (2013.01); *B23K 31/02* (2013.01); *F28D 20/00* (2013.01)

(58) Field of Classification Search
CPC .......... B23K 1/008; B23K 3/08; B23K 31/02; B23K 35/3618; F28D 20/00;
(Continued)

(56) References Cited

U.S. PATENT DOCUMENTS 4,885,915 A * 12/1989 Jakobsson ............. F24D 11/002
62/238.6
4,909,430 A * 3/1990 Yokota ................... B23K 1/008
219/388
(Continued)

FOREIGN PATENT DOCUMENTS

CH 297507 3/1954
DE 2707244 9/1978
(Continued)

OTHER PUBLICATIONS

International Search Report dated Jun. 12, 2018 for PCT Application No. PCT/JP2018/011727, 2 pages.
(Continued)

*Primary Examiner* — Kiley S Stoner
(74) *Attorney, Agent, or Firm* — Squire Patton Boggs (US) LLP

(57) ABSTRACT

To provide a work processing apparatus equipped with a vaporizer that requires no carrier gas and can vaporize a vaporization target liquid having a relatively high flow rate, and a method for manufacturing a processed work. A vaporizer 1 includes a vaporization part 10 including a heat storage body 11 having a heat capacity higher than that of a vaporization target liquid Fq by a predetermined ratio, and a heat supplier 20 for supplying heat to the vaporization part 10. The predetermined ratio is a ratio of heat capacity at which a temperature drop of the heat storage body 11 by heat transfer from the heat storage body 11 to the liquid Fq flowing through a path 12 is within a predetermined range, wherein the amount of heat transferred from the heat storage (Continued)

body 11 to the liquid Fq is an amount of heat necessary to vaporize the liquid Fq at a planned proportion. A work processing apparatus 100 includes the vaporizer 1, a chamber 5, and a vacuum pump 6 for creating a negative pressure in the chamber 5. The method of manufacturing a processed work includes taking the work W into the chamber 5, supplying a processing gas Fg generated in the vaporizer 1 into the chamber 5, and performing predetermined processing on the work W under an atmosphere of the processing gas Fg in the chamber 5.

10 Claims, 3 Drawing Sheets

(51) Int. Cl.
  *B23K 3/08*    (2006.01)
  *B23K 31/02*   (2006.01)
  *F28D 20/00*   (2006.01)

(58) Field of Classification Search
  CPC ......... F28D 2021/0064; F28D 20/0056; H05B
    3/22; B01D 1/0017; F24H 1/121; F24H
    1/162; F28F 3/12; Y02E 60/142
  USPC .......................................... 228/214–223, 42
  See application file for complete search history.

(56) References Cited

U.S. PATENT DOCUMENTS

| | | | |
|---|---|---|---|
| 5,318,101 A | 6/1994 | Kim et al. | |
| 6,344,407 B1 | 2/2002 | Matsuki et al. | |
| 6,906,296 B2 * | 6/2005 | Centanni | A61L 2/07 |
| | | | 219/628 |
| 2004/0131344 A1 | 7/2004 | Zimmer | |
| 2005/0095168 A1 * | 5/2005 | Centanni | H05B 6/108 |
| | | | 422/3 |
| 2008/0078145 A1 * | 4/2008 | Tu | B23K 1/008 |
| | | | 53/404 |
| 2008/0128530 A1 | 6/2008 | Milli | |
| 2010/0218933 A1 * | 9/2010 | Deacon | F24D 11/002 |
| | | | 165/285 |
| 2011/0248074 A1 * | 10/2011 | Davies | B23K 1/008 |
| | | | 228/256 |
| 2012/0114869 A1 | 5/2012 | Miyoshi et al. | |
| 2012/0298332 A1 * | 11/2012 | Petters | F28D 3/00 |
| | | | 165/104.11 |
| 2013/0105558 A1 * | 5/2013 | Abe | B23K 1/0016 |
| | | | 228/179.1 |
| 2013/0175323 A1 * | 7/2013 | Zhang | H01L 21/67173 |
| | | | 228/4.1 |
| 2014/0290286 A1 * | 10/2014 | Liebert | H05K 1/0203 |
| | | | 62/63 |
| 2015/0321278 A1 * | 11/2015 | Matsuda | B23K 1/005 |
| | | | 219/85.13 |
| 2015/0366079 A1 * | 12/2015 | Matsuda | B23K 1/0016 |
| | | | 219/72 |
| 2016/0045841 A1 * | 2/2016 | Kaplan | C10G 1/02 |
| | | | 429/49 |
| 2016/0069625 A1 * | 3/2016 | Deacon | F28F 27/02 |
| | | | 165/96 |
| 2016/0120058 A1 * | 4/2016 | Shedd | H05K 7/20327 |
| | | | 165/244 |
| 2016/0120059 A1 * | 4/2016 | Shedd | H05K 7/208 |
| | | | 165/244 |
| 2016/0120065 A1 * | 4/2016 | Shedd | F25B 41/003 |
| | | | 165/104.29 |
| 2016/0120071 A1 * | 4/2016 | Shedd | H05K 7/1485 |
| | | | 361/679.47 |
| 2016/0128238 A1 * | 5/2016 | Shedd | F28D 15/00 |
| | | | 361/679.47 |
| 2016/0178235 A1 | 6/2016 | Taguchi et al. | |
| 2016/0220955 A1 * | 8/2016 | Ozawa | B23K 3/08 |
| 2016/0334330 A1 * | 11/2016 | Kobayashi | B23K 3/08 |
| 2017/0203377 A1 * | 7/2017 | Yokoyama | H01L 21/67103 |
| 2019/0314917 A1 * | 10/2019 | Nagai | B23K 1/008 |

FOREIGN PATENT DOCUMENTS

| | | | | |
|---|---|---|---|---|
| EP | 0628370 A1 * | 12/1994 | | B23K 3/085 |
| EP | 1300630 A1 | 4/2003 | | |
| EP | 2471622 A1 | 7/2012 | | |
| JP | 59-108632 U1 | 7/1984 | | |
| JP | H 08334266 A | 12/1996 | | |
| JP | H 102616 A | 1/1998 | | |
| JP | H 10218134 A | 8/1998 | | |
| JP | 2002 208564 A | 7/2002 | | |
| JP | 2002 210555 A | 7/2002 | | |
| JP | 2007 100207 A | 4/2007 | | |
| JP | 2015 112603 A | 6/2015 | | |
| WO | WO-9414563 A1 * | 7/1994 | | B23K 35/38 |
| WO | WO 2008 015915 A1 | 2/2008 | | |
| WO | WO-2011024813 A1 * | 3/2011 | | B23K 1/008 |

OTHER PUBLICATIONS

Communication forwarding the extended European Search Report dated Mar. 17, 2020 issued for European Patent Application No. 18774172.3, 8 pages.

* cited by examiner

WORK PROCESSING APPARATUS AND METHOD FOR MANUFACTURING A PROCESSED WORK

CROSS-REFERENCE

This application is a 35 U.S.C. 371 filing of International Application No. PCT/JP2018/011727 filed on Mar. 23, 2018, which claims priority to Japanese Application No. JP 2017-068056 filed on Mar. 30, 2017, both of which are incorporated verbatim herein by reference in their entirety, including the specifications, drawings, and the claims.

TECHNICAL FIELD

This invention relates to a work processing apparatus and a method for manufacturing a processed work, and, more particularly, to a work processing apparatus including a vaporizer that requires no carrier gas and can vaporize a vaporization target liquid having a relatively high flow rate and a method for manufacturing a processed work.

BACKGROUND ART

As a soldering apparatus that achieves solder bonding without using a flux, there is an apparatus in which oxides on a metal surface of a bonding target member are reduced with a reducing agent such as formic acid before solder bonding is achieved. As means for vaporizing a formic acid liquid (vaporization target liquid) in order to supply formic acid gas to a bonding target member, there is means in which, when a carrier gas such as nitrogen is introduced into a bubbling tank in which a formic acid liquid is reserved, the carrier gas, supplied into the formic acid liquid in the bubbling tank, ascends toward a space above the liquid surface of the formic acid liquid and, at this time, a formic acid gas is generated since the formic acid liquid is turned to gas and mixed into the carrier gas (for example, see Patent Document 1).

RELATED ART DOCUMENT

Patent Document

Patent Document 1: JP 2015-112603 A (See paragraph 0030 and FIG. 2 etc.)

SUMMARY OF THE INVENTION

Problem to be Solved by the Invention

In the vaporization means described in Patent Document 1, a carrier gas is required and the flow rate of the vaporization target liquid to be vaporized is low.

In view of the above problem, an object of this invention is to provide a work processing apparatus equipped with a vaporizer that requires no carrier gas and can vaporize a vaporization target liquid having a relatively high flow rate, and a method for manufacturing a processed work.

Means for Solving the Problem

To achieve the above object, a vaporizer of a work processing apparatus according to the first aspect of the present invention includes, as shown in FIG. 1, for example, a vaporization part 10 including a heat storage body 11 having a heat capacity higher than that of a vaporization target liquid Fq by a predetermined ratio; and a heat supplier 20 for supplying heat to the vaporization part 10; wherein the heat storage body 11 has a heat storage body flow path 12 formed therein, the heat storage body flow path 12 being a flow path through which the vaporization target liquid Fq flows; and wherein the predetermined ratio is a ratio of heat capacity at which a temperature drop of the heat storage body 11 by heat transfer from the heat storage body 11 to the vaporization target liquid Fq flowing through the heat storage body flow path 12 is within a predetermined range, wherein the amount of heat transferred from the heat storage body 11 to the vaporization target liquid Fq is an amount of heat necessary to vaporize the vaporization target liquid Fq at a planned proportion.

With this configuration, because the vaporization target liquid is vaporized by heat stored in the heat storage body, it is possible to provide an amount of heat exceeding the heat supply capacity of the heat supplier to the vaporization target liquid flowing through the heat storage body flow path. Thus, a vaporization target liquid can be vaporized without using a carrier gas, and a vaporization target liquid having a relatively high flow rate can be vaporized.

To achieve the above object, a vaporizer of a work processing apparatus according to the second aspect of the present invention includes, as shown in FIG. 1, for example, a vaporization part 10 including a heat storage body 11 formed of a metal block; and a heat supplier 20 for supplying heat to the vaporization part 10; wherein the heat storage body 11 is configured to have a heat storage body flow path 12 formed therein by boring holes in the block.

With this configuration, when the vaporization target liquid is vaporized by heat stored in the heat storage body, it is possible to provide an amount of heat exceeding the heat supply capacity of the heat supplier to the vaporization target liquid flowing through the heat storage body flow path. Thus, a vaporization target liquid can be vaporized without using a carrier gas, and a vaporization target liquid having a relatively high flow rate can be vaporized.

As for the vaporizer of the work processing apparatus according to the third aspect of the present invention, as shown in FIGS. 1 and 2, for example, in the vaporizer 1 of the work processing apparatus 100 according to the first or second aspect, the heat supplier 20 includes an embedded heater 21 embedded in the heat storage body 11.

With this configuration, because heat can be supplied to a region close to the heat storage body flow path compared to the case where the heat storage body is heated from outside, heat can be promptly supplied to a part that may experience a drop in temperature because of vaporization of the vaporization target liquid.

As for the vaporizer of the work processing apparatus according to the fourth aspect of the present invention, as shown in FIG. 1, for example, in the vaporizer 1 of the work processing apparatus 100 according to any one of the first through third aspect, the vaporization part 10 is configured to include a low-heat capacity flow path forming member 15 on a downstream side of the heat storage body 11 with respect to a flow direction of the vaporization target liquid Fq and the low-heat capacity flow path forming member 15 is a member forming a flow path through which the vaporization target liquid Fq flows and has a heat capacity lower than that of the heat storage body 11; and the heat supplier 20 is configured to include a downstream side heater 25 for heating the low-heat capacity flow path forming member 15.

With this configuration, because the amount of heat to the vaporization target liquid can be easily adjusted on the downstream side of the heat storage body where the proportion of liquid is relatively low, complete vaporization of the vaporization target liquid can be efficiently achieved.

As for the vaporizer of the work processing apparatus according to the fifth aspect of the present invention, as shown in FIG. 2A, for example, in the vaporizer 1 of the work processing apparatus 100 (see FIG. 1) according to any one of the first through fourth aspect, the heat storage body flow path 12 is formed to include a bent portion.

With this configuration, because the vaporization target liquid is temporarily retained in the bent portion, the vaporization efficiency can be improved.

As for the work processing apparatus according to the first or second aspect of the present invention, as shown in FIG. 1, for example, the invention further includes, in addition to the above configuration, a chamber 5 for processing a work W therein and the chamber 5 is configured to be able to be airtight from outside, where a flow path in the vaporizer 1 through which the vaporization target liquid Fq flows and an inside of the chamber 5 are communicated with each other; and a vacuum pump 6 for creating a negative pressure in the inside of the chamber 5.

With this configuration, vaporization of the vaporization target liquid can be promoted by creating a negative pressure in the flow path through which the vaporization target liquid flows in the vaporizer via the inside of the chamber.

As for a method for manufacturing a processed work according to the sixth aspect of the present invention, as shown in FIGS. 1 and 3, for example, a method for manufacturing a processed work W using the work processing apparatus 100 of any one of the first through fifth aspect. The method includes a take in step (S2) of taking the work W into the chamber 5; a processing gas supply step (S5) of supplying a processing gas Fg generated by vaporizing the vaporization target liquid Fq in the vaporizer 1 into the chamber 5; and a work processing step (S6) of performing predetermined processing on the work W under an atmosphere of the processing gas Fg in the chamber 5.

With this configuration, the work can be processed appropriately without using a carrier gas.

According to the present invention, because the vaporization target liquid is vaporized by heat stored in the heat storage body, it is possible to provide an amount of heat exceeding the heat supply capacity of the heat supplier to the vaporization target liquid flowing through the heat storage body flow path. Thus, a vaporization target liquid can be vaporized without using a carrier gas, and a vaporization target liquid having a relatively high flow rate can be vaporized.

DESCRIPTION OF EMBODIMENTS

Figure 1:
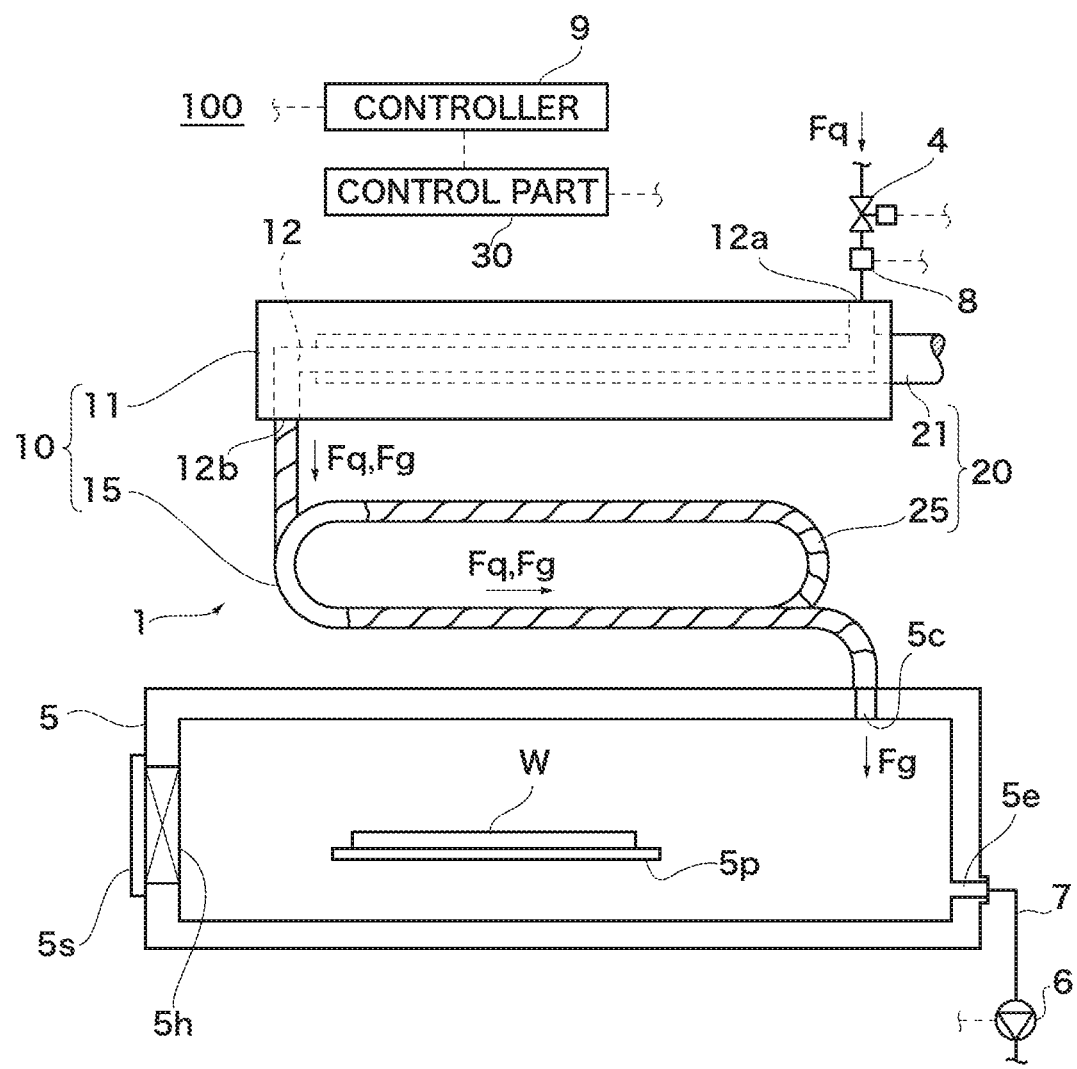
FIG. 1 is a general configuration diagram of a work processing apparatus according to an embodiment of the present invention.

This application is based on the Patent Application No. 2017-068056 filed on Mar. 30, 2017 in Japan, the contents of which are hereby incorporated in its entirety by reference into the present application, as part thereof.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Description will hereinafter be made of an embodiment of the present invention with reference to the drawings. The same or corresponding members are denoted with the same reference numerals in all the drawings, and their descriptions are not repeated.

Referring first to FIG. 1, a work processing apparatus 100 according to an embodiment of the present invention is described. FIG. 1 is a general configuration diagram of the work processing apparatus 100. The work processing apparatus 100 includes a vaporizer 1, a chamber 5 in which a work W (workpiece W) is processed, a vacuum pump 6, and a controller 9. In this embodiment, the work W is a plate-shaped substrate, and has an upper surface with a metallic portion on which solder (not shown) is placed. In this embodiment, the processing of the work W is to melt the solder placed on the upper surface by heating to perform soldering.

In this embodiment, when the work W is processed, an atmosphere of formic acid gas, which is a type of carboxylic acid gas, is created in the chamber 5 in order to reduce oxides on the metallic portion on a surface of the work W with the carboxylic acid gas without using a flux before solder bonding is performed. Formic acid is generally reserved in the form of liquid because of its easy storage, and is supplied into the chamber 5 after being vaporized as needed. When a formic acid liquid (may be aqueous solution) stored in the form of liquid is vaporized into formic acid gas, a carrier gas such as an inert gas is conventionally used to improve the vaporization efficiency and to transport the vaporized formic acid gas. The use of a carrier gas, however, causes a decrease in the formic acid gas concentration and also a reduction in the flow rate of the generated formic acid gas. The vaporizer 1 and the work processing apparatus 100 according to this embodiment eliminate this inconvenience.

The vaporizer 1 includes a vaporization part 10 for vaporizing a formic acid liquid Fq as a vaporization target liquid, a heat supplier 20 for supplying heat to the vaporization part 10, and a control part 30. The vaporization part 10 has a block 11, and a downstream pipe 15. The heat supplier 20 has embedded heaters 21 for supplying heat to the block 11, and a ribbon heater 25 for supplying heat to the downstream pipe 15. A flow path for the formic acid liquid Fq is formed in the block 11 and the downstream pipe 15 constituting the vaporization part 10, and the downstream pipe 15 is located on the downstream side of the block 11 with respect to the flow direction of the formic acid liquid Fq. The vaporization part 10 is configured such that most or all of the formic acid liquid Fq is vaporized in the block 11 and, even if some liquid remains unvaporized, the remaining formic acid liquid Fq is vaporized in the downstream pipe 15 so that all the introduced formic acid liquid Fq can be converted into the formic acid gas Fg as a whole.

The block 11 is formed of a material that can provide an amount of heat necessary to vaporize the introduced formic acid liquid Fq (vaporization target liquid) to the formic acid liquid Fq. In this embodiment, in view of heat capacity and the type of vaporization target liquid (formic acid liquid Fq) to be dealt with, SUS316 or a nickel base alloy containing a large amount of molybdenum or chromium is used. The block 11 has heat storage properties, and is a form of heat storage body. Also, in this embodiment, from the standpoint of ease of processing and good fittability (downsizing), the block 11 has a rectangular parallelepiped basic shape. In the block 11, a block flow path 12 through which the formic acid liquid Fq passes and spaces in which the embedded heaters 21 are installed are formed inside the rectangular parallelepiped basic shape. The block flow path 12 corresponds to a heat storage body flow path.

Figure 2A:
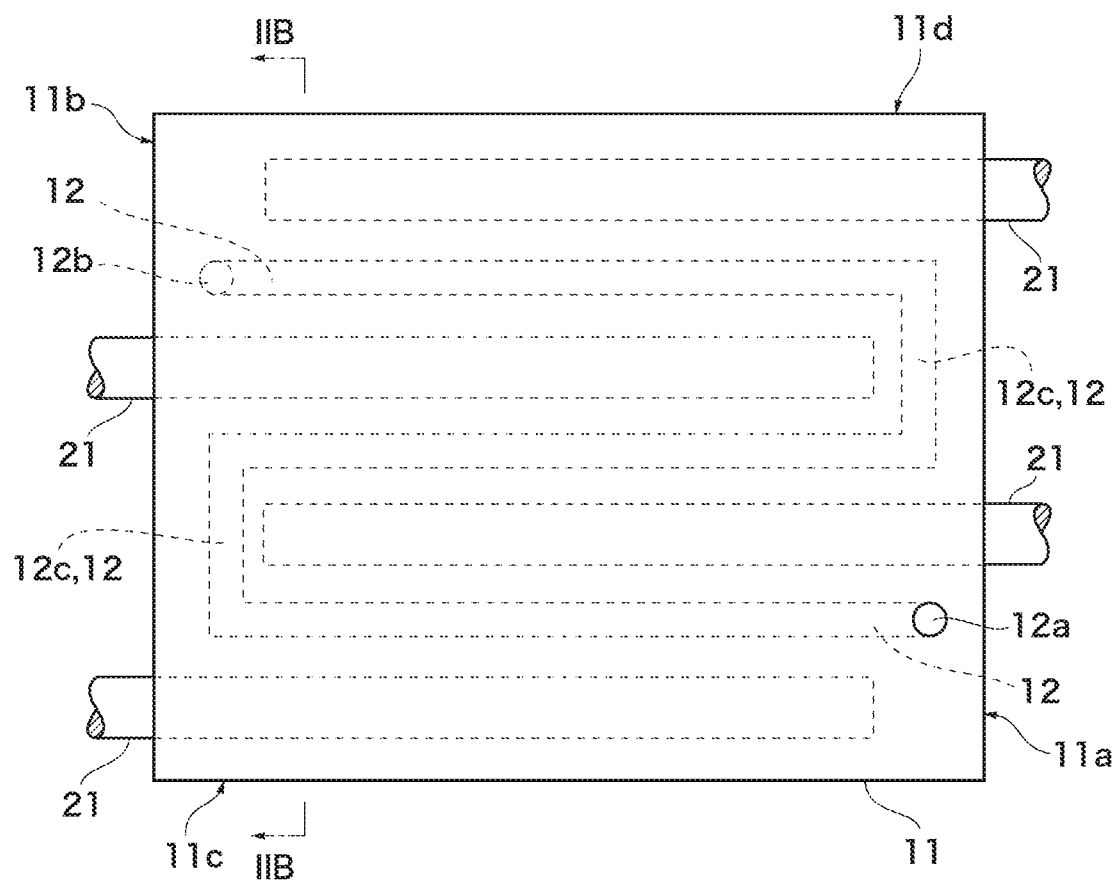
FIG. 2A is a plan view of a block constituting a vaporizer included in the work processing apparatus according to an embodiment of the present invention.
Figure 2B:
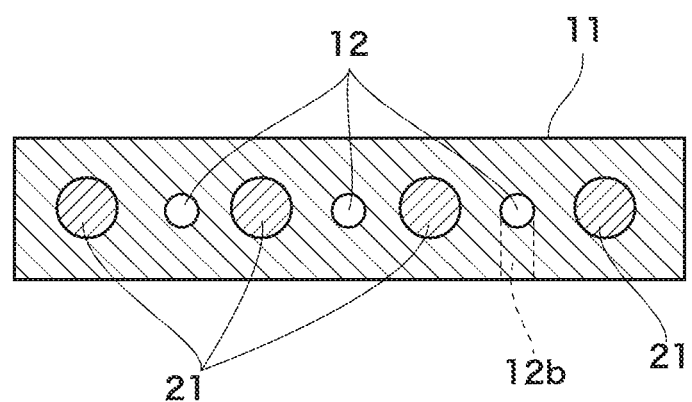
FIG. 2B is a cross-sectional view taken along the line IIB-IIB in FIG. 2A.

FIG. 2A is a plan view of the block 11, and FIG. 2B is a cross-sectional view taken along the line IIB-IIB in FIG. 2A. In this embodiment, three linear parts of the block flow path 12 and four linear embedded heaters 21 are provided in the block 11. Each linear part of the block flow path 12 and each embedded heater 21 are arranged parallel to each other at the same height. Also, each linear part of the block flow path 12 is arranged between adjacent embedded heaters 21 so that the linear parts of the block flow path 12 and the embedded heaters 21 can be alternate when viewed in a horizontal direction. In this way, in this embodiment, the embedded heaters are arranged along the linear parts of the block flow path 12. The distance between the block flow path 12 and the embedded heaters 21 is set at such a distance that the heat generation in the embedded heaters 21 does not inhibit heat transfer from the block 11 to the formic acid liquid Fq flowing through the block flow path 12, and is typically such a distance that the formic acid liquid Fq flowing through the block flow path 12 is stably heated by heat stored in the block 11.

One of the linear parts of the block flow path 12 on both sides among the three linear parts of the block flow path 12 has an inlet port 12a formed to open in an upper surface of the block 11, and the other linear part of the block flow path 12 has an outlet port 12b formed to open in a lower surface of the block 11. The inlet port 12a is communicated with a longitudinal end of the block flow path 12, and the outlet port 12b is communicated with a longitudinal end of the block flow path 12 on the opposite side of the inlet port 12a. The linear part of the block flow path 12 communicated with the inlet port 12a and the linear part of the block flow path 12 arranged at the center are communicated by a connecting flow path 12c constituting a bent portion on the opposite side of the inlet port 12a. The linear part of the block flow path 12 communicated with the outlet port 12b and the linear part of the block flow path 12 arranged at the center are communicated by another connecting flow path 12c constituting a bent portion on the opposite side of the outlet port 12b. Since the three linear part of the block flow path 12 are connected by the two connecting flow paths 12c constituting the bent portions as described above, one block flow path 12 is formed as a whole. This configuration enables the formic acid liquid Fq (and the formic acid gas Fg vaporized on the way) to flow in through the inlet port 12a, flow through the block flow path 12, and flow out through the outlet port 12b. Since the bent portions are included in the block flow path 12, the formic acid liquid Fq can be temporarily retained in the bent portions to improve vaporization efficiency. On the other hand, because the bent portions of the block flow path 12 increase flow resistance of the formic acid liquid Fq, the number and curvature of the bent portions should preferably be determined in consideration of the balance among vaporization efficiency, flow resistance and the size of the block 11. For example, the block flow path 12 can be formed with a diameter of approximately 8 to 10 mm when having a circular cross-section. The block flow path 12 may have an elliptical or polygonal cross-sectional shape.

Each of the three linear parts of the block flow path 12 can be formed by horizontally boring a hole with a drill from a side 11a, on the side of the inlet port 12a, or a side 11b, on the side of the outlet port 12b, of the block 11. The block flow path 12 communicating each of the linear parts of the block flow path 12 on both sides among the three linear parts of the block flow path 12 with the central part of the block flow path 12 can be formed by horizontally boring a hole with a drill from one or both of two sides 11c and 11d perpendicular to the side 11a (and the side 11b). When the above hole boring is performed, the formed block flow paths 12 open in the sides 11a, 11b, 11c and 11d. The holes that do not constitute the block flow path 12 can, however, be closed by welding or the like. In this way, the block flow path 12 can be formed relatively long in a fixed volume without using any joint. The holes into which the embedded heaters 21 are inserted can be formed by horizontally boring holes with a drill from the side 11a or the side 11b. Since the plurality of holes into which the embedded heaters 21 are inserted do not have to be communicated with each other, each of the holes into which the embedded heaters 21 are inserted may be formed in conformity to the embedded heaters 21.

A series of the parts of the block flow path 12 from the inlet port 12a to the outlet port 12b is formed to have a predetermined length including the bent portions. Here, the predetermined length is a length sufficient to provide heat in such an amount that when a planned amount of formic acid liquid Fq is fed, the planned amount of formic acid liquid Fq can be vaporized at a planned proportion with respect to the fed formic acid liquid Fq, in consideration of the shape and number of the connecting flow paths 12c constituting the bent portions (the length can be shortened by an amount by which the vaporization efficiency is improved by the bent portions). The planned amount of formic acid liquid Fq is typically an amount used in single processing of the work W, and, when the amount of formic acid liquid Fq that flows per processing at predetermined intervals is determined using, for example, a timer or flowmeter, the heat capacity of the formic acid liquid Fq per processing is determined. Also, in this embodiment, the planned proportion at which the formic acid liquid Fq is vaporized in the block 11 is a proportion of the amount where the amount to be vaporized in the downstream pipe 15 is subtracted from the introduced planned amount of formic acid gas Fg to the introduced planned amount of formic acid gas Fg. The planned proportion can be set to 90 to 95%, for example. In view of such a function of the block 11 to vaporize a planned amount of formic acid liquid Fq at a planned proportion, the block 11 is formed to have a heat capacity higher than that of the planned amount of formic acid liquid Fq by a predetermined ratio. Here, the predetermined ratio is a ratio of heat capacity at which the block 11 has a temperature drop within a predetermined range when an amount of heat necessary when a planned amount of formic acid liquid Fq is fed to the block flow path 12 and the formic acid liquid Fq is vaporized at a planned proportion is transferred from the block 11 to the formic acid liquid Fq. Also, the predetermined range is a range such that the temperature of the block 11 restores sufficiently to continue vaporization of the formic acid liquid Fq before a new planned amount of formic acid liquid Fq is next fed.

In this embodiment, as the embedded heaters 21, electric heaters that receive electrical energy and generate heat by Joule heat are used. As described above, the embedded heaters 21 are embedded in the block 11 and each of them is configured to be able to heat the block 11. The embedded heaters 21 are configured to indirectly heat the formic acid liquid Fq flowing through the block flow path 12 by heating the block 11 and storing heat in the block 11. While an example in which the embedded heaters 21 are arranged at equal intervals is shown in FIG. 2, a larger number of embedded heaters 21 may be installed in a part close to an upstream portion of the block flow path 12 where the proportion of the formic acid liquid Fq is relatively high in order to provide more heat to it. The embedded heaters 21 are electrically connected to a power source (not shown), the output of which is controlled by the control part 30 (see FIG. 1).

Referring again to FIG. 1, description of the configuration of the vaporizer 1 is continued. Although the downstream pipe 15 is typically a pipe formed of the same material as the block 11, it may be a pipe formed of another material suitable for the type of the vaporization target liquid (formic acid liquid Fq) to be dealt with. The downstream pipe 15, which is formed of a general-purpose pipe with no excessively thick wall and has a lower heat capacity than the block 11, corresponds to a low-heat capacity flow path forming member. The downstream pipe 15 has one end connected to the outlet port 12b of the block 11 with its other end connected to the chamber 5. The ribbon heater 25 is wound around an outer periphery of the downstream pipe 15. The ribbon heater 25, which supplies heat to the downstream pipe 15, corresponds to a downstream side heater. The ribbon heater 25 is a ribbon-shaped elongated heater, and is configured to receive electrical energy and generate heat by Joule heat. Although the ribbon heater 25 is shown in a partially cutaway manner in FIG. 1 so that the downstream pipe 15 can be viewed for convenience of description, the entire outer surface of the downstream pipe 15 is covered with the ribbon heater 25 in reality. The downstream pipe 15 wound with the ribbon heater 25 is configured such that the changes in output of the ribbon heater 25 have a direct influence on changes in enthalpy of a mixed fluid of the formic acid liquid Fq and the formic acid gas Fg flowing through the downstream pipe 15. The downstream pipe 15 wound with the ribbon heater 25 is formed to have a sufficient length to vaporize all the formic acid liquid Fq that remains unvaporized in the block 11. As in the case of the block flow path 12, when the downstream pipe 15 has bent portions, the bent portions contributes to improvement of vaporization efficiency of the formic acid liquid Fq and enables the necessary length of the downstream pipe 15 to be shortened. The ribbon heater 25 is electrically connected to a power source (not shown), the output of which is controlled by the control part 30. Because the downstream pipe 15 wound with the ribbon heater 25 is provided on the downstream side of the block 11, the load of the block 11 decreases and the size of the block 11 can be reduced, resulting in reduction in costs. The block 11 and the downstream pipe 15 wound with the ribbon heater 25 are preferably covered with a heat insulating material.

Referring continuously to FIG. 1, the configuration of the work processing apparatus 100 except the vaporizer 1 is described. The chamber 5 is configured to be able to hermetically close the inside. The chamber 5 is typically formed to have a rectangular parallelepiped shape. An opening 5h through which the work W can be taken in and out is formed through a side of the chamber 5, and a shutter 5s that can open and close the opening 5h is provided. A mounting table 5p on which the work W is mounted is provided in the chamber 5. A heater for heating the work W is incorporated in the mounting table 5p. Also, a feed port 5c through which the formic acid gas Fg generated in the vaporizer 1 is introduced and a discharge port 5e through which the fluid in the chamber 5 is discharged are formed in the chamber 5. Although the feed port 5c is formed at an upper part of the chamber 5 and the discharge port 5e is formed through a side of the chamber 5 opposite the opening 5h in this embodiment, the feed port 5c and the discharge port 5e may be formed at other locations. The downstream pipe 15 is connected to the feed port 5c. The chamber 5 is configured to be able to be airtight from the outside with the downstream pipe 15 and the block flow path 12 (flow paths through which the formic acid liquid Fq and the formic acid gas Fg flow) of the vaporizer 1 communicated with the inside of the chamber 5. In this embodiment, the formic acid gas Fg supplied into the chamber 5 through the feed port 5c is processing gas used to process the work W. A vacuum pipe 7 is connected to the discharge port 5e.

A vacuum pump 6 is provided in the vacuum pipe 7. The vacuum pipe 7 forms a flow path for directing the fluid in the chamber 5 to the outside of the chamber 5. The vacuum pump 6 is configured to discharge the fluid in the chamber 5 to the outside of the chamber 5 through the vacuum pipe 7. The work processing apparatus 100 is configured to be able to create a negative pressure (a pressure lower than the atmospheric pressure) in the chamber 5 by operating the vacuum pump 6.

Also, the work processing apparatus 100 is provided with a mass flow controller 8 (which is hereinafter referred to as "MFC 8") on the upstream side of the vaporizer 1, and configured such that the formic acid liquid Fq flows into the vaporizer 1 after passing through the MFC 8. Because the MFC 8 is provided, the mass flow rate of the formic acid liquid Fq flowing into the vaporizer 1 can be controlled. Also, an on-off valve 4 is provided upstream of the MFC 8 so that the introduction and shutoff of the formic acid liquid Fq to the vaporizer 1 can be switched.

The controller 9 is a device for controlling operation of the work processing apparatus 100. The controller 9 is electrically connected to the control part 30 of the vaporizer 1 in a wired or wireless manner, and is configured to be able to adjust outputs of the embedded heater 21 and the ribbon heater 25 by sending control signals. Also, the controller 9 is electrically connected to the vacuum pump 6 in a wired or wireless manner, and is configured to be able to control start and stop of the vacuum pump 6 by sending control signals. Also, the controller 9 is electrically connected to the MFC 8 in a wired or wireless manner, and is configured to be able to adjust the flow rate of the formic acid liquid Fq passing through the MFC 8 (therefore the flow rate of the formic acid liquid Fq to be introduced into the vaporizer 1) by sending control signals. Also, the controller 9 is electrically connected to the on-off valve 4 in a wired or wireless manner, and is configured to be able to switch open and close of the on-off valve 4 by sending control signals. Although the controller 9 and the control part 30 of the vaporizer 1 are depicted as being separate structures located adjacent to each other for convenience of description, they may be arranged in a physically separate manner or may be constituted in an inseparable manner as one device that combines the functions of both.

Figure 3:
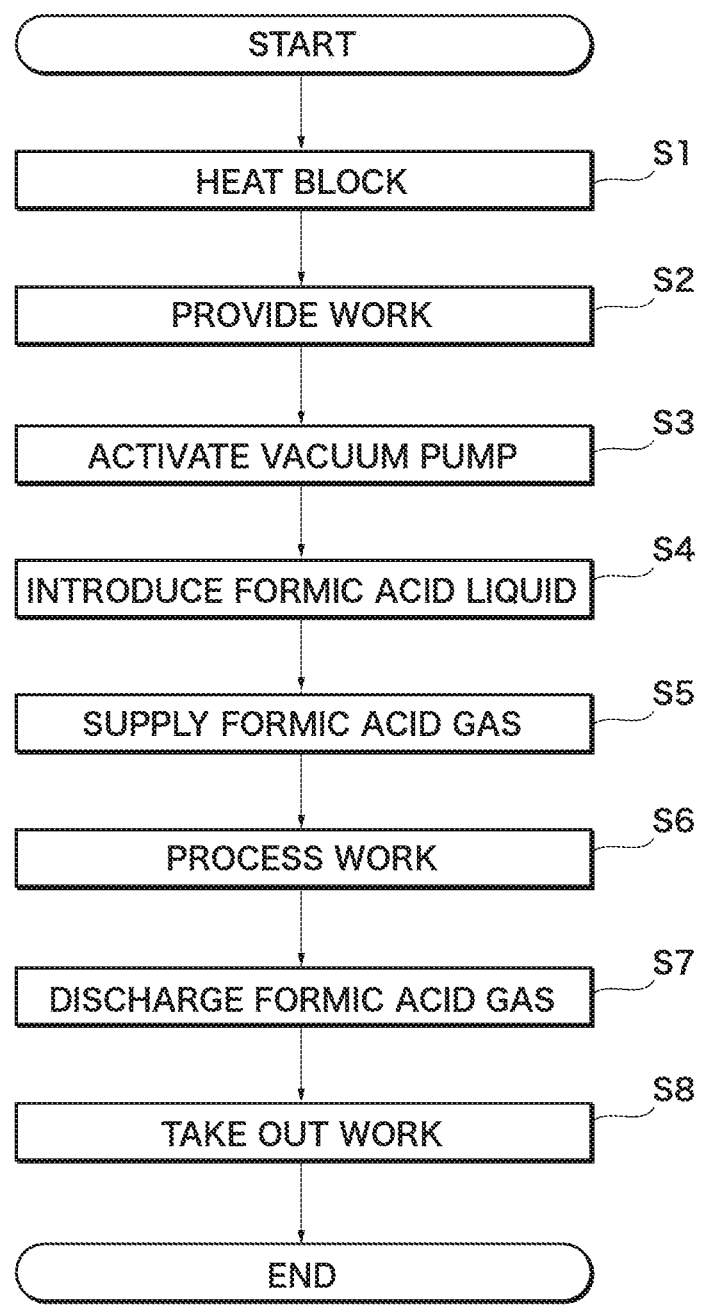
FIG. 3 is a flowchart showing a procedure for processing a work.

Referring continuously to FIG. 3, a method for manufacturing a processed work according to an embodiment of the present invention is described. FIG. 3 is a flowchart showing a process of manufacturing a processed work. In the following, a method for manufacturing a processed work using the work processing apparatus 100 as described hereinbefore (see FIG. 1) is described. The following description of a method for manufacturing a processed work using the work processing apparatus 100 also serves as description of operations of the work processing apparatus 100 and the vaporizer 1 included therein. In the following description, when mention is made of the configuration of the work processing apparatus 100, reference is made to FIG. 1 and FIG. 2 as appropriate.

When the work W is processed, the control part 30 first operates the embedded heater 21 to heat the block 11 (S1). The reason why the block 11 is first heated is because the block 11 has such a high heat capacity that it takes some time to heat the block 11 to a temperature necessary to vaporize the formic acid liquid Fq (approximately 100 to 150 degrees) when it has an ordinary temperature. The time necessary to heat the block 11 varies depending on the temperature of the block 11 at which heating is started. Once the block 11 has been heated sufficiently to vaporize the formic acid liquid Fq, the shutter 5s of the chamber 5 is opened and the work W with solder (not shown) placed thereon is taken into the chamber 5 (take in step: S2). After the work W is taken into the chamber 5, the work W is mounted on the mounting table 5p and the shutter 5s is closed, and the controller 9 operates the vacuum pump 6 for a predetermined period of time (S3). By operating the vacuum pump 6, a negative pressure is created inside the chamber 5 and inside the block flow path 12 and the downstream pipe 15. The predetermined period of time for which the vacuum pump 6 is operated is time necessary to create a previously-intended degree of vacuum in the chamber 5 and so on. The previously-intended degree of vacuum is a degree of vacuum suitable for promoting vaporization of the formic acid liquid Fq to be introduced later, and is approximately 50 to 5000 Pa (absolute pressure), for example.

After operating the vacuum pump 6 for a predetermined period of time, the controller 9 introduces the formic acid liquid Fq into the vaporizer 1 (S4). To introduce the formic acid liquid Fq into the vaporizer 1, the controller 9 opens the on-off valve 4. Then, the formic acid liquid Fq is passed through the on-off valve 4 by the pressure at the source where the formic acid liquid Fq is reserved (not shown). After a planned amount of formic acid liquid Fq passes, the controller 9 closes the on-off valve 4. In this way, the planned amount of formic acid liquid Fq flows toward the vaporizer 1. The formic acid liquid Fq having passed through the on-off valve 4 is subjected to appropriate flow rate adjustment while passing through the MFC 8 and then introduced into the vaporizer 1.

The formic acid liquid Fq introduced into the vaporizer 1 first flows through the block flow path 12 toward the chamber 5 having a negative pressure. While flowing through the block flow path 12, the formic acid liquid Fq receives heat from the block 11, which has preliminarily stored heat, and has an increase in enthalpy. Then, the vaporization amount of the formic acid liquid Fq gradually increases and the proportion of the formic acid gas Fg increases as the formic acid liquid Fq flows downward. At this time, because the block flow path 12, which is communicated with the inside of the chamber 5, has a negative pressure therein, vaporization of the formic acid liquid Fq is promoted. Also, because the formic acid liquid Fq is temporarily retained in the bent portions and intensively receives heat from the block 11 when the formic acid liquid Fq flows through the bent portions while flowing through the block flow path 12, the vaporization efficiency of the formic acid liquid Fq is improved at the bent portions. Also, because the formic acid liquid Fq having flowed into the block flow path 12 is vaporized by heat from the block 11 while flowing on its own toward the chamber 5 with a lower pressure, the formic acid liquid Fq can be vaporized without using a carrier gas. In other words, creating a negative pressure in the chamber 5 contributes to eliminating the need for a carrier gas. Also, because the formic acid liquid Fq flowing through the block flow path 12 is vaporized utilizing heat preliminarily stored in the block 11, it is possible to avoid a situation in which the amount of heat necessary to vaporize the formic acid liquid Fq becomes insufficient. Because the embedded heaters 21 continue to generate heat, the heat taken from the block 11 by the formic acid liquid Fq is restored before the formic acid liquid Fq is next introduced into the block 11. By the time when the formic acid liquid Fq introduced into the block 11 reaches the outlet port 12b as an end point of the block flow path 12 and flows into the downstream pipe 15, the planned proportion of the formic acid liquid Fq has been vaporized into the formic acid gas Fg. Thus, a mixed fluid of the formic acid gas Fg and the formic acid liquid Fq flows into the downstream pipe 15.

The control part 30 has started heat generation in the ribbon heater 25 before the mixed fluid of the formic acid gas Fg and the formic acid liquid Fq flows into the downstream pipe 15 so that the downstream pipe 15 can be heated sufficiently to vaporize the formic acid liquid Fq. The mixed fluid of the formic acid gas Fg and the formic acid liquid Fq having flowed into the downstream pipe 15 receives heat from the ribbon heater 25 and has an increase in enthalpy while flowing through the downstream pipe 15. Then, the vaporization amount of the formic acid liquid Fq gradually increases and the proportion of the formic acid gas Fg increases as the formic acid liquid Fq flows downward. At this time, because the downstream pipe 15, which is communicated with the inside of the chamber 5, has a negative pressure therein, vaporization of the formic acid liquid Fq is promoted. The formic acid liquid Fq remaining in the mixed fluid of the formic acid gas Fg and the formic acid liquid Fq flowing through the downstream pipe 15 is completely vaporized into the formic acid gas Fg before the mixed fluid reaches the end point of the downstream pipe 15 (the feed port 5c). In this way, in the vaporizer 1, all the introduced formic acid liquid Fq is converted into the formic acid gas Fg. The time from when the formic acid liquid Fq is introduced into the vaporizer 1 until when the formic acid gas Fg reaches the end point of the downstream pipe 15 is approximately several seconds.

The formic acid gas Fg generated in the vaporizer 1 is supplied into the chamber 5 (processing gas supply step: S5). As the formic acid gas Fg is supplied, an atmosphere of the formic acid gas Fg is created in the chamber 5. By creating an atmosphere of the formic acid gas Fg in the chamber 5, an oxide film formed on a surface of a metallic portion of the work W can be reduced with formic acid and removed. Because the formic acid gas Fg supplied into the chamber 5 contains no carrier gas, a decrease in formic acid concentration can be avoided and the time necessary to reduce the oxide film can be shortened compared to the case where a carrier gas is used. When the chamber 5 is filled with the formic acid gas Fg, the controller 9 operates the heater in the mounting table 5p to heat the work W in order to perform processing of the work W (work processing step: S6). The processing of the work W here is, as mentioned above, to melt the solder placed on an upper surface of the work W by heating to perform soldering. When the processing of the work W is completed, the controller 9 stops heating of the work W, and discharges the formic acid gas Fg in the chamber 5 to the outside of the chamber 5 (S7). The formic acid gas Fg in the chamber 5 is discharged through the vacuum pipe 7 by the operation of the vacuum pump 6. Simultaneously with the discharge of the formic acid gas Fg out of the chamber 5, an inert gas such as nitrogen may be introduced into the chamber 5 to replace the formic acid gas Fg in the chamber 5 with the inert gas. After the formic acid gas Fg is discharged out of the chamber 5, the shutter 5s is opened to take the work W out of the chamber 5 (S8). In this way, a processed work W is manufactured. After one processed work W is manufactured, the flow for processing of the next work W is started in the same manner as described above. The intervals at which the works W are processed (the intervals at which the formic acid liquid Fq is introduced into the vaporizer 1) can be set to approximately three minutes, for example. In other words, in the work processing apparatus 100 according to this embodiment, the processing of the work W is performed in approximately three-minute cycles, and the formic acid liquid Fq is supplied for several seconds during the cycle. Heat is stored in the block 11 while the formic acid liquid Fq is not flowing, and the stored heat can be used to heat the formic acid liquid Fq in the next cycle. In other words, the formic acid liquid Fq is introduced into the vaporizer 1 intermittently (for example, at intervals of approximately three minutes), and the formic acid gas Fg is also supplied into the chamber 5 intermittently. The shutter 5s may be opened and closed manually or may be operated by the controller 9.

As described above, according to the vaporizer 1 according to this embodiment, because the formic acid liquid Fq introduced into the block 11 is vaporized by heat stored in the block 11, the formic acid liquid Fq having a relatively high flow rate (for example, approximately 5 g/sec or higher) can be vaporized without using a carrier gas. Also, because a planned proportion of the introduced formic acid liquid Fq is vaporized in the block 11 and the formic acid liquid Fq that remains unvaporized in the block 11 is vaporized in the downstream pipe 15, which receives heat from the ribbon heater 25, an increase in size of the block 11 can be avoided, and the amount of heat provided to the formic acid liquid Fq in the downstream pipe 15 can be easily adjusted. Thus, complete vaporization of the formic acid liquid Fq can be efficiently achieved. Also, according to the work processing apparatus 100 according to this embodiment, because a negative pressure is created in the chamber 5 located on the downstream side of the vaporizer 1, a negative pressure can be also created in the downstream pipe 15 and the block flow path 12, which are communicated with the inside of the chamber 5, and vaporization of the formic acid gas Fg in the vaporizer 1 can be promoted.

In the above description, although the vaporization part 10 has the block 11 and the downstream pipe 15, the downstream pipe 15 may be omitted and the vaporization part 10 may be constituted only of the block 11. In this case, the planned proportion at which the introduced formic acid liquid Fq is vaporized in the block 11 is 100%. Alternatively, even when the vaporization part 10 has the block 11 and the downstream pipe 15, all the introduced formic acid liquid Fq may be vaporized in the block 11 (the planned proportion is 100%) and temperature control of the formic acid gas Fg may be performed in the downstream pipe 15.

In the above description, although the block flow path 12 (heat storage body flow path) is formed by boring holes into a rectangular parallelepiped block 11, the block 11 may be formed by filling a space around pipes in which a heat storage body flow path is formed (in this case, when joints with a small radius of curvature are used for the bent portions, the pipes can be arranged more densely with smaller intervals therebetween than the case where the block flow path 12 is formed by bending a pipe) with a metal having a melting point lower than that of the pipes. In other words, the block 11 having the block flow path 12 may be formed by covering pipes in which a heat storage body flow path is formed with a metal. For example, lead or solder may be used when the material of the pipes is copper, or cast iron may be used in addition to lead when the material of the pipes is stainless. With this configuration, the flow path for the vaporization target liquid can be produced more easily compared to the case of boring holes into the block 11.

In the above description, although the heat suppliers for the block 11 are the embedded heaters 21 embedded along the block flow path 12, the embedded heaters 21 may be embedded across the block flow path 12 (intersect the block flow path 12 perpendicularly or at an angle of 75 or 60 degrees) in the block 11, instead of or in addition to along the block flow path 12, as viewed in a plan view or side view. Alternatively, the heat suppliers for the block 11 may be provided to cover the outside of the block 11 instead of or in addition to being embedded in the block 11.

In the above description, although the vaporization target liquid is a formic acid liquid, the vaporization target liquid may be a liquid other than a formic acid liquid, such as water. When the vaporization target liquid is water, a small vaporizer in which the flow rate can be adjusted easily can be achieved. Although vaporization can be promoted when a negative pressure is created in the block flow path 12 (and the flow path in the downstream pipe 15 when the downstream pipe 15 is provided), there may be no need to create a negative pressure when the vaporization target liquid can be vaporized by heat supplied from the heat suppliers for the block 11 (and heat supplied from the heat supplier for the downstream pipe 15) under atmospheric pressure.

In the above description, the work processing apparatus and the method for manufacturing a processed work according to the embodiment of the present invention have been described as an example with FIGS. 1 through 3. However, the configuration, the structure, the quantity, the arrangement, the shape and the material of each part are not restricted to the above-mentioned example, but such components which those skilled in the art apply selectively are included in the scope of the present invention as long as they incorporate philosophy of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1 vaporizer
5 chamber
6 vacuum pump
10 vaporization part
11 block
12 block flow path
15 downstream pipe
20 heat supplier
21 embedded heater
25 ribbon heater
100 work processing apparatus
Fq formic acid liquid
W work

The invention claimed is:

1. A work processing apparatus, comprising:
a vaporizer having:
a vaporization part including a heat storage body having a heat capacity higher than that of a vaporization target liquid by a predetermined ratio, the vaporization target liquid being a carboxylic acid; and
a heat supplier for supplying heat to the vaporization part;
a chamber for processing a work therein, the chamber being configured to be able to be airtight from outside, where a flow path in the vaporizer through which the vaporization target liquid flows and an inside of the chamber are communicated with each other; and
a vacuum pump for creating a negative pressure in the inside of the chamber and an inside of the flow path through which the vaporization target liquid flows;
wherein the heat storage body has a heat storage body flow path formed therein, the heat storage body flow path being a flow path through which the vaporization target liquid flows; and
wherein the predetermined ratio is a ratio of heat capacity at which a temperature drop of the heat storage body by heat transfer from the heat storage body to the vaporization target liquid flowing through the heat storage body flow path is within a predetermined range, wherein the amount of heat transferred from the heat storage body to the vaporization target liquid is an amount of heat necessary to vaporize the vaporization target liquid at a planned proportion.

2. A work processing apparatus, comprising:
a vaporizer having
a vaporization part including a heat storage body formed of a metal block, the heat storage body having a heat storage body flow path formed therein by boring holes in the block, the heat storage body flow path being a flow path through which a vaporization target liquid flows, the vaporization target liquid being a carboxylic acid, and
a heat supplier for supplying heat to the vaporization part;
a chamber for processing a work therein, the chamber being configured to be able to be airtight from outside, where a flow path in the vaporizer through which the vaporization target liquid flows and an inside of the chamber are communicated with each other; and
a vacuum pump for creating a negative pressure in the inside of the chamber and an inside of the flow path through which the vaporization target liquid flows.

3. The work processing apparatus of claim 1, wherein the heat supplier includes an embedded heater embedded in the heat storage body.

4. The work processing apparatus of claim 1, wherein the vaporization part is configured to include a low-heat capacity flow path forming member on a downstream side of the heat storage body with respect to a flow direction of the vaporization target liquid, the low-heat capacity flow path forming member being a member forming a flow path through which the vaporization target liquid flows and having a heat capacity lower than that of the heat storage body; and
wherein the heat supplier is configured to include a downstream side heater for heating the low-heat capacity flow path forming member.

5. The work processing apparatus of claim 1, wherein the heat storage body flow path is formed to include a bent portion.

6. A method for manufacturing a processed work using the work processing apparatus of claim 1, the method comprising:
a take in step of taking the work into the chamber;
a processing gas supply step of supplying a processing gas generated by vaporizing the vaporization target liquid in the vaporizer into the chamber; and
a work processing step of performing predetermined processing on the work under an atmosphere of the processing gas in the chamber.

7. The work processing apparatus of claim 2, wherein the heat supplier includes an embedded heater embedded in the heat storage body.

8. The work processing apparatus of claim 2, wherein the vaporization part is configured to include a low-heat capacity flow path forming member on a downstream side of the heat storage body with respect to a flow direction of the vaporization target liquid, the low-heat capacity flow path forming member being a member forming a flow path through which the vaporization target liquid flows and having a heat capacity lower than that of the heat storage body; and wherein the heat supplier is configured to include a downstream side heater for heating the low-heat capacity flow path forming member.

9. The work processing apparatus of claim 2, wherein the heat storage body flow path is formed to include a bent portion.

10. A method for manufacturing a processed work using the work processing apparatus of claim 2, the method comprising:
   a take in step of taking the work into the chamber;
   a processing gas supply step of supplying a processing gas generated by vaporizing the vaporization target liquid in the vaporizer into the chamber; and
   a work processing step of performing predetermined processing on the work under an atmosphere of the processing gas in the chamber.

\* \* \* \* \*